(12) United States Patent
Pratt

(10) Patent No.: US 9,440,771 B2
(45) Date of Patent: Sep. 13, 2016

(54) SUPPORT ASSEMBLY AND COMPONENTS

(71) Applicant: William K. Pratt, Bedford, PA (US)

(72) Inventor: William K. Pratt, Bedford, PA (US)

(73) Assignee: COMPANY BLACK LLC, Bedford, PA (US)

( * ) Notice: Subject to any disclaimer, the term of this patent is extended or adjusted under 35 U.S.C. 154(b) by 0 days.

(21) Appl. No.: 14/535,818

(22) Filed: Nov. 7, 2014

(65) Prior Publication Data

US 2016/0130032 A1    May 12, 2016

(51) Int. Cl.
*B65D 19/00* (2006.01)
*B65D 19/20* (2006.01)

(52) U.S. Cl.
CPC ..... *B65D 19/20* (2013.01); *B65D 2519/00562* (2013.01); *B65D 2519/00567* (2013.01); *B65D 2519/00825* (2013.01)

(58) Field of Classification Search
CPC ..... B65D 19/20; B65D 19/385; B65D 19/44
USPC ............... 108/51.3, 55.3, 56.3, 57.13, 57.19
See application file for complete search history.

(56) References Cited

U.S. PATENT DOCUMENTS

| | | | |
|---|---|---|---|
| 1,201,981 A | 10/1916 | Pitcher | |
| 2,506,346 A | 5/1950 | Crawford | |
| 2,716,532 A | 8/1950 | Wysong, Jr. et al. | |
| 2,589,651 A | 3/1952 | Ballard | |
| 2,626,456 A | 1/1953 | Harrison | |
| 2,774,490 A | 12/1956 | Strong | |
| 2,803,363 A * | 8/1957 | Hutchinson | B66F 9/18 108/55.3 |
| 2,997,266 A | 8/1959 | Munroe | |
| 2,913,206 A | 11/1959 | Paris | |
| 3,167,038 A | 1/1965 | Brown | |
| 3,288,311 A | 11/1966 | Beattie | |
| 3,302,593 A | 2/1967 | Roberts | |
| 3,472,363 A | 10/1969 | Overton | |
| 3,520,258 A | 7/1970 | Shepherd | |
| 3,587,479 A | 6/1971 | Geschwender | |
| 3,589,309 A | 6/1971 | Clark, Jr. | |
| 3,753,407 A | 8/1973 | Tilseth | |
| 3,838,632 A | 10/1974 | Miyake | |
| 3,907,241 A | 9/1975 | Oglesby et al. | |
| 4,093,760 A | 6/1978 | O'Malley | |
| 4,170,451 A | 10/1979 | Luff | |
| 4,195,732 A * | 4/1980 | Bell | B65D 19/44 206/386 |
| 4,220,099 A * | 9/1980 | Marchesano | B65D 19/0069 108/57.1 |
| 4,241,810 A | 12/1980 | Newlon | |
| 4,253,826 A | 3/1981 | Campbell, Jr. | |
| 4,305,508 A * | 12/1981 | Rodgers | B65D 19/0095 108/55.3 |
| 4,382,733 A | 5/1983 | Rodgers | |
| 4,405,673 A | 9/1983 | Fridley et al. | |
| 4,428,893 A | 1/1984 | Cummings, Jr. et al. | |
| 4,501,402 A | 2/1985 | Saito et al. | |
| 4,747,775 A | 5/1988 | Takagi et al. | |
| 4,898,102 A | 2/1990 | Thebeau | |

(Continued)

OTHER PUBLICATIONS

U.S. Appl. No. 14/613,472 to William K. Pratt filed Feb. 4, 2015.

*Primary Examiner* — Hanh V Tran
(74) *Attorney, Agent, or Firm* — Vorys, Sater, Seymour and Pease LLP

(57) ABSTRACT

A member formed of a set of elongated corrugated cardboard plies secured together with a biodegradable adhesive along the lengths thereof and coated with a biodegradable coating which may be stacked to form a support for a portion of an elongated weighty member.

27 Claims, 4 Drawing Sheets

(56) References Cited

U.S. PATENT DOCUMENTS

| | | | |
|---|---|---|---|
| 5,092,367 A | 3/1992 | Gilleland | |
| 5,184,558 A * | 2/1993 | Wozniacki | B65D 19/0028 108/51.3 |
| 5,191,740 A | 3/1993 | Rose | |
| 5,207,631 A * | 5/1993 | Schmidtke | B31D 5/00 108/51.3 |
| 5,218,913 A * | 6/1993 | Winebarger | B65D 19/0024 108/51.3 |
| 5,230,291 A | 7/1993 | Juvik-Woods | |
| 5,357,875 A * | 10/1994 | Winebarger | B65D 19/0024 108/51.3 |
| 5,386,786 A | 2/1995 | Kilpatrick et al. | |
| 5,425,314 A * | 6/1995 | MacFarland | B65D 19/0012 108/51.3 |
| 5,427,019 A * | 6/1995 | Moorman | B65D 19/0026 108/51.3 |
| 5,461,988 A | 10/1995 | Cummings et al. | |
| 5,465,672 A | 11/1995 | Boyse et al. | |
| 5,487,345 A * | 1/1996 | Winebarger | B65D 19/0024 108/51.3 |
| 5,490,465 A | 2/1996 | Hoyt et al. | |
| 5,515,977 A | 5/1996 | Lambert | |
| 5,531,166 A | 7/1996 | Woods et al. | |
| 5,537,937 A | 7/1996 | Juvik-Woods | |
| 5,568,774 A * | 10/1996 | Hutchison | B65D 19/0012 108/51.3 |
| 5,685,233 A | 11/1997 | DeJean | |
| 5,685,234 A * | 11/1997 | Grigsby | B31B 7/00 108/51.3 |
| 5,799,584 A | 9/1998 | Campbell | |
| 5,941,177 A | 8/1999 | Auderson | |
| 5,996,509 A | 12/1999 | Lai | |
| 6,076,475 A | 6/2000 | Kuhn et al. | |
| 6,135,030 A | 10/2000 | Besaw | |
| 6,155,181 A * | 12/2000 | Chilcutt | B65D 19/0012 108/51.3 |
| 6,550,741 B1 * | 4/2003 | Cottone | B60P 7/12 108/51.11 |
| 6,672,029 B2 | 1/2004 | Tucker | |
| 7,503,727 B2 | 3/2009 | Ingebretsen et al. | |
| 7,959,059 B2 | 6/2011 | Tamamori et al. | |
| 8,113,129 B1 * | 2/2012 | Hurley | B65D 19/0028 108/51.3 |
| 8,127,929 B1 * | 3/2012 | Lu | B65D 19/0095 108/51.3 |
| 8,469,085 B2 | 6/2013 | Orgeron | |
| 8,544,814 B2 | 10/2013 | Diaz | |
| 9,174,768 B2 * | 11/2015 | Love | B65D 19/385 |
| 2002/0189507 A1 * | 12/2002 | Benner | B65D 19/0012 108/51.3 |
| 2007/0237612 A1 * | 10/2007 | Mammome | B65F 1/1468 414/420 |
| 2007/0256614 A1 * | 11/2007 | Chen | B65D 19/0069 108/153.1 |
| 2010/0078429 A1 | 4/2010 | Strang et al. | |
| 2012/0204767 A1 * | 8/2012 | Jian | B65D 19/0028 108/51.3 |
| 2012/0260832 A1 * | 10/2012 | Linares | B65D 19/0095 108/51.3 |
| 2013/0115010 A1 | 5/2013 | Connors et al. | |
| 2013/0216339 A1 * | 8/2013 | Apps | A47B 81/007 414/304 |
| 2013/0343834 A1 | 12/2013 | Flusche | |

\* cited by examiner

SUPPORT ASSEMBLY AND COMPONENTS

This invention relates to an assembly of components for supporting a weighty object such as a large metal pipe, and more particularly to such an assembly in which the components thereof are simple in design, formed of comparatively inexpensive materials, lightweight, easily fabricated, easily transportable and manually handled, capable of sustaining heavy loads and readily disposable after effective usage.

BACKGROUND OF THE INVENTION in the oil and natural gas industries, it is a common practice to transmit fluid commodities from one site to another. Such practice generally consists of forming a trench between such sites, providing and placing a transmission pipeline in such trench and filling such trench with excavated soil to permanently bury such pipeline. Typically, following the formation of such trench, segments of such pipeline are transported to successive locations along and adjacent a trench line, mounted on skids or pallets in end-to end relation, welded together, transferred into the adjacent, opened trench and covered with earth to provide a buried transmission pipeline.

In the prior art, such skids or pallets used to support pipeline segments have consisted of stacks of solid, wooden beams. Typically, such beams have been formed and stored in warehouses or other storage sites distant from such pipeline routes, transported from distant storage sites to a location proximate a pipeline trench, repositioned by local machinery at spaced intervals along the opened trench, assembled at such sites onto skids or pallets for supporting the ends of successive sets of pipes to be welded together, disassembled upon welding and loading the welded segments into the trench and either transported to a successive site along the pipeline route to be used again or transported to a local storage area or a distant storage facility for further usage as described.

Such practice of use of such skid or pallet components has been found to be uneconomical. Initially, it is to be noted that such components being formed of wood are expensive. Such cost further is increased by the costs of storing, transporting to and from an assembly storage and use sites, handling at use sites and discarding damaged or worn components. Accordingly, the principal object of the present invention is to provide a component for the purpose as described which is more economical to produce and use than predecessor components.

SUMMARY OF THE INVENTION

The present invention overcomes and improves upon the shortcomings and deficiencies of the prior art by providing a support assembly for a weighty object such as a heavy metal pipeline segment, which includes a base tier including a pair of spaced beams; and at least one upper tier including a pair of spaced beams disposed angularly relative to and supported on a set of beams of a lower tier, wherein each of such beams is formed of a set of plies of corrugated cardboard secured together with a biodegradable adhesive, and such set of plies is coated with a biodegradable material. In the various embodiments of the invention, at least one additional beam may be provided in each tier of such assembly, the beams of each tier of such assembly are disposed at an angle, preferably a right angle to the beams of a successive tier of such assembly, such beams may be provided with two or three recesses on one or both upper and lower surfaces for receiving portions of a beam of a successive tier in locking engagement therewith and a beam in an uppermost tier may be provided in a center position with a depression for accommodating the placement and resting of an elongated member such as a pipeline segment.

In a still further embodiment of the invention, each tier of a stacked set of support components includes a retangularly configured member formed of a set of plies of corrugated card board secured together with a biodegradable adhesive, coated with a biodegradable coating and or degradable coating, with those components intended for an upper tier being provided with an elongated recess having a curved cross-sectional configuration for receiving and resting a tubular member such as a pipeline segment.

DETAILED DESCRIPTION OF THE PREFERRED EMBODIMENT OF THE INVENTION

Figure 1:
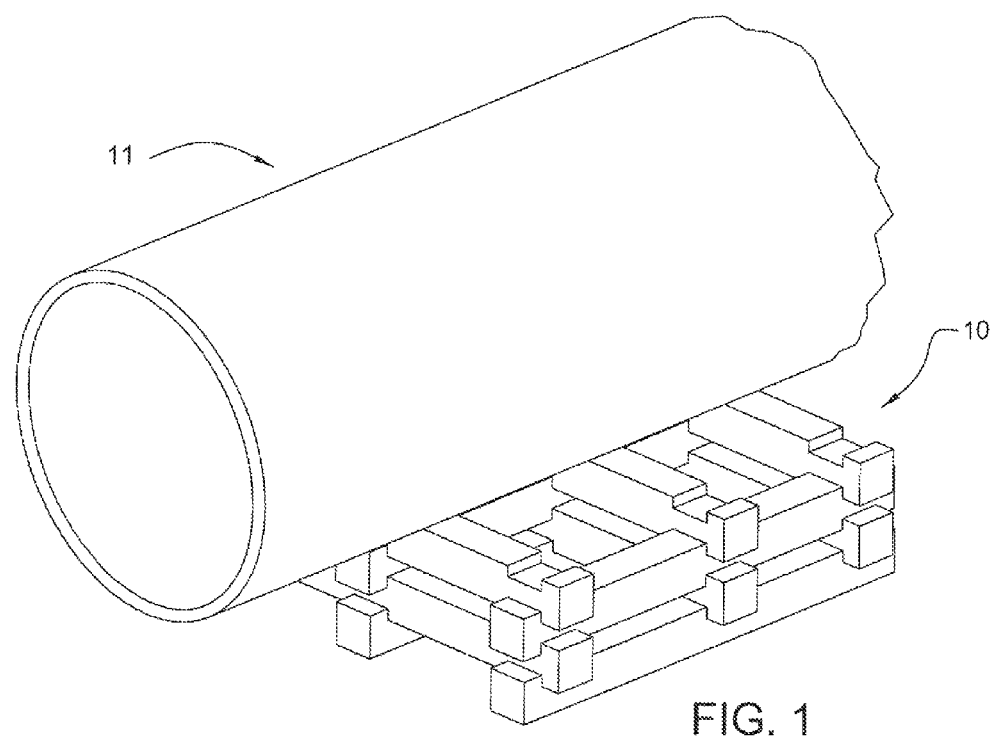
FIG. 1 is a perspective view of a first embodiment of the invention consisting of an assembly functional to support a portion of a large pipe segment.
Figure 2:
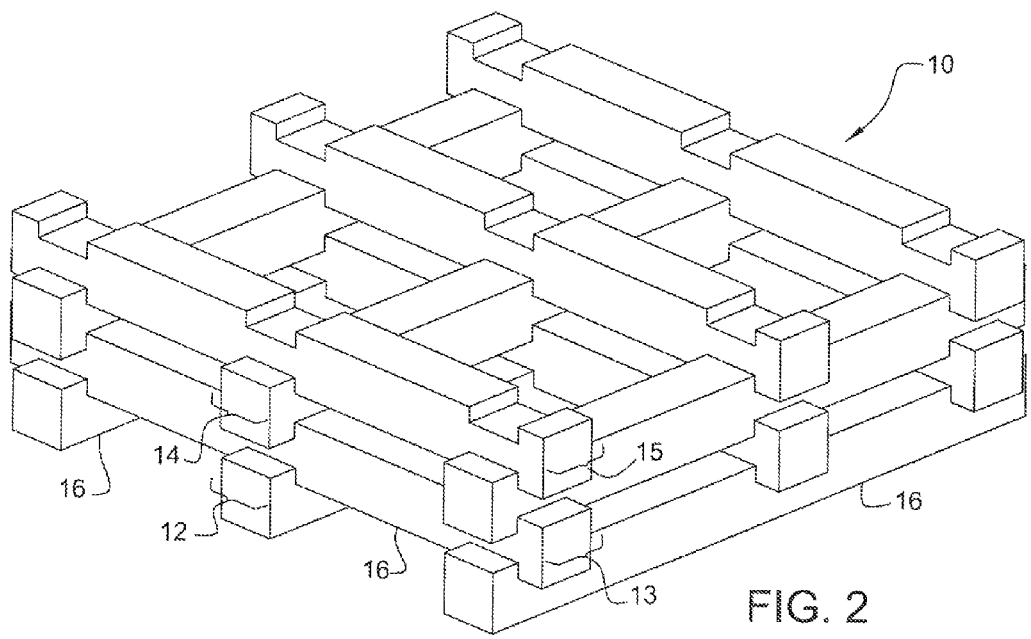
FIG. 2 is a clear perspective view of the assembly shown in FIG. 1 supporting a pipe segment.
Figure 4:
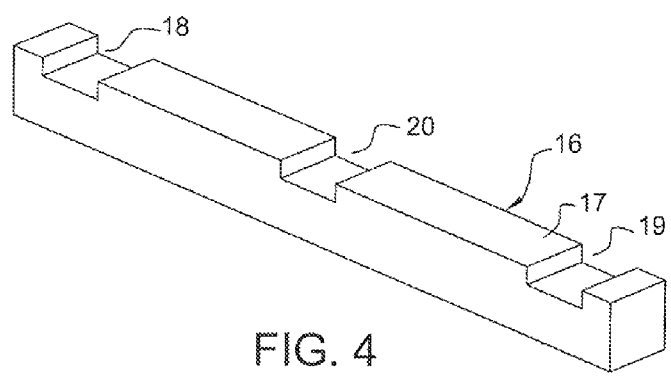
FIG. 4 is a perspective view of a component beam utilized in forming the support assembly shown in FIGS. 1 and 2 or 3.

Referring to FIGS. 1 and 2 of the drawings, there is shown a first embodiment of the invention including an assembly 10 supporting a portion of a pipeline segment 11, providing a base tier 12 and a set of upper tiers 13, 14 and 15, each provided with a set of beams 16 as shown in FIG. 4. As best shown in FIG. 4, each beam 16 is generally rectangulary configured with an elongated rectangular surface 17 provided with a pair of spaced recesses 18 and 19 disposed adjacent the ends thereof and a centrally disposed recess 20 between recesses 18 and 19. Base tier 12 of assembly 10 includes a set of three parallel, spaced beams 16, with the recesses 18, 19 and 20 of each of such beams aligned with comparable recesses in each of the other two beams of such tier. Each of the upper tiers 13, 14 and 15 includes a set of three parallel, spaced beams 16, with the recesses 18, 19 and 20 of each of such beams aligned with comparable recesses in each of the other two beams of such tier, with each of such beams being disposed at a right angle relative to a beam in a lower tier and received in and seated in an aligned set of recesses in a set of beams of a lower tier.

Figure 5:
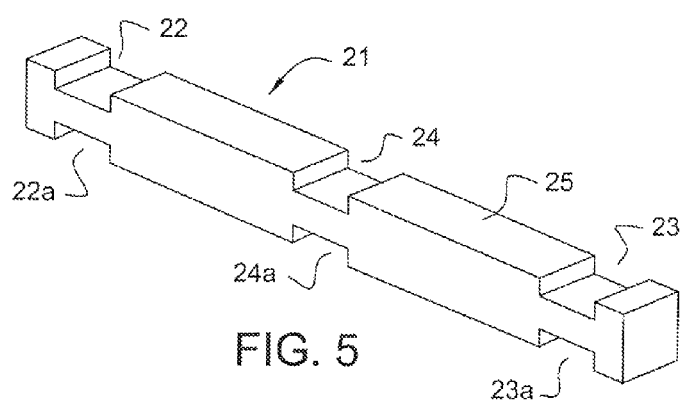
FIG. 5 is a perspective view an alternate component beam that may be utilized in forming a support assembly as shown in FIGS. 1 and 2 or 3.

In lieu of a set of beams as shown in FIG. 4 in forming an assembly as shown in FIGS. 1 and 2, a beam 21 as shown in FIG. 5 may be used. Such beam is provided with a first set of recesses 22, 23 and 24 in an upper surface 25, comparable to recesses 18, 19 and 20 of beam 16, and a second set of recesses 22*a*, 23*a* and 24*a* in an opposite surface, comparable and aligned, respectively, with recesses 22, 23 and 24 in the upper surface thereof. A plurality of beams 21 may be assembled together as described with respect to beam 16 to form an assembly similar to that shown in FIG. 3. In such modified assembly, the recesses on the underside of beams 21 are aligned to receive portions of the beams in upper and/or lower beams to provide a greater rigidity to the assembly.

Figure 3:
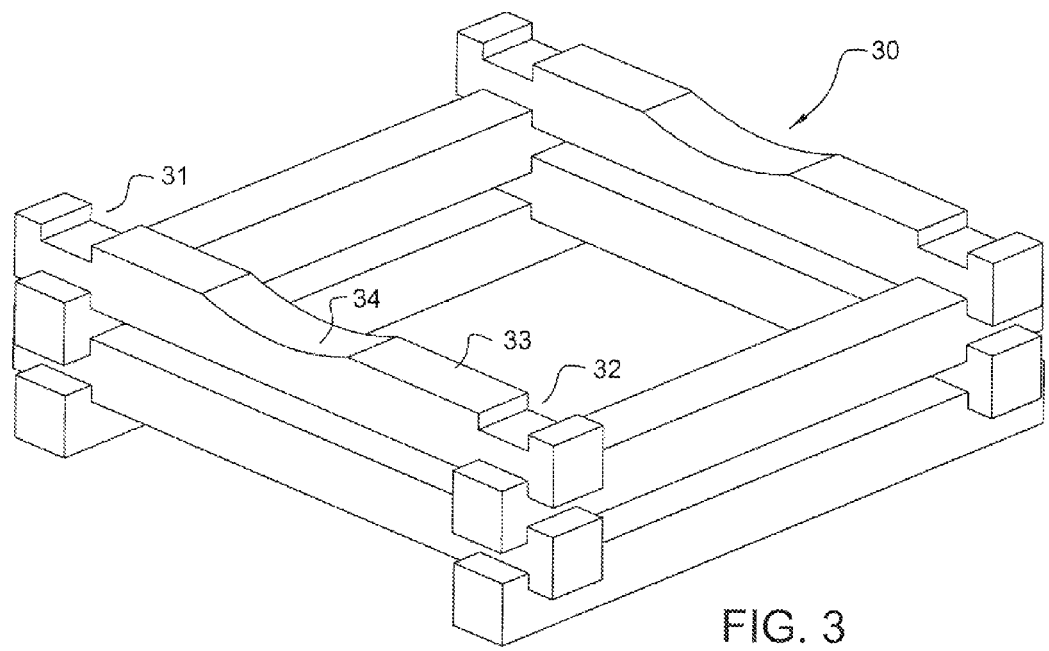
FIG. 3 is a perspective view of another embodiment of the present invention similarly functional to support a portion of a large pipe segment as shown in FIG. 1.
Figure 6:
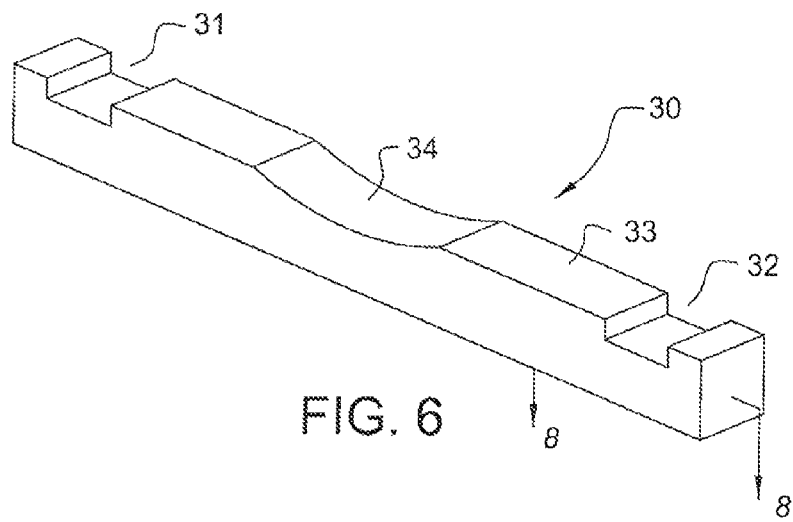
FIG. 6 is a perspective view of a component beam utilized in forming the support assembly shown in FIG. 3.
Figure 7:
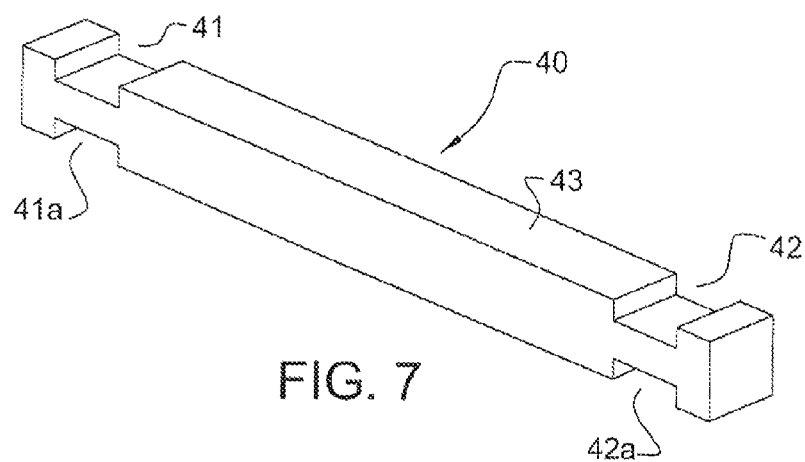
FIG. 7 is a perspective view of an alternate component beam that may be utilized in forming the a support assembly shown in FIG. 3.

Referring to FIG. 3 of the drawings, there is disclosed a perspective view of a further embodiment of the invention. Such embodiment is similar to the embodiment shown in FIG. 2 but includes only two beams per tier. Such beams include a configuration as provided in a beam 30 shown in FIG. 6 and a configuration as provided in a beam 40 shown in FIG. 7, Beam 30 is configured similarly to the configuration of beam 16 shown in FIG. 4 including a pair of spaced recesses 31 and 32 in a surface 33, with a curved, shallow depression 34 centered between recesses 31 and 32 in lieu of a recess as provided in beam 16. Beam 40 is configured similarly to the configuration of either beam 16 or 21, omitting any centered recess or depression and providing a spaced set of recesses 41*a* and 42*a* in an opposite surface, each aligned with a recess 41 or 42, respectively. Beams 30 and 40 may be assembled in a manner as described with respect to beams 20 and 21 to form an assembly as shown in FIG. 3 with two spaced beams in each tier, the beams of each upper tier being disposed at right angles to the beams of a successive tier and either of the beams being provided in the uppermost tier with such uppermost beams preferably consisting of beam 30 with the depressions 34 being aligned to provide a resting surface for a portion of a pipeline segment.

Figure 8:
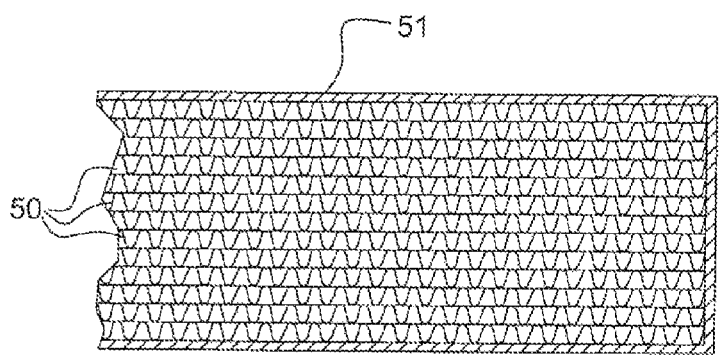
FIG. 8 is an enlarged sectional view taken along lines 8-8 in FIG. 6, illustrating the composition of the internal structure of the beam shown in FIG. 6 and comparable to the compositions of the structure of each of the component beams utilized in any of the disclosed beam assemblies.

Referring to FIG. 8, each of the beams described is formed of a plurality of plies 50 of corrugated cardboard, secured together with a biodegradable adhesive and coated with a biodegradable material providing a durable casing. The adhesive may consist of Dexatrin, starched based glues, Casein glues or Mucilage. The coating may consist of natural rubber, latex, India rubber, polyisoprene, polymers of isoprene, polyisoprene elastomers, polymer cis-1, 4-polyisoprene, 2-octylcyanoacrylate, cyanoacrylate esters or vinyl identified by CAS numbers by the Chemical Abstracts Service, a division of the American Chemical Society.

In the use of the beams as described, they may be initially stored at an offsite location, manually loaded on vehicles and transported to selected use sites, manually unloaded and stacked at such selected use sites, manually transferred to selected sites along a pipeline route and assembled as described for mounting a pipeline segment, disassembled after removal of the pipeline segment possibly shredded and disposed of either by burial or other means upon ineffectiveness or deterioration in use. Such construction, handling and disposition of such beams provides not only for a minimal cost of production of such beams but in a facilitation and low cost of usage thereof. The fabrication of such beams provides a low cost, the reduced weight thereof permits manual handling thereof and the disposal aspect thereof eliminates further handling and transportation thereof, substantially reducing the cost in the use of such beams.

Figure 9:
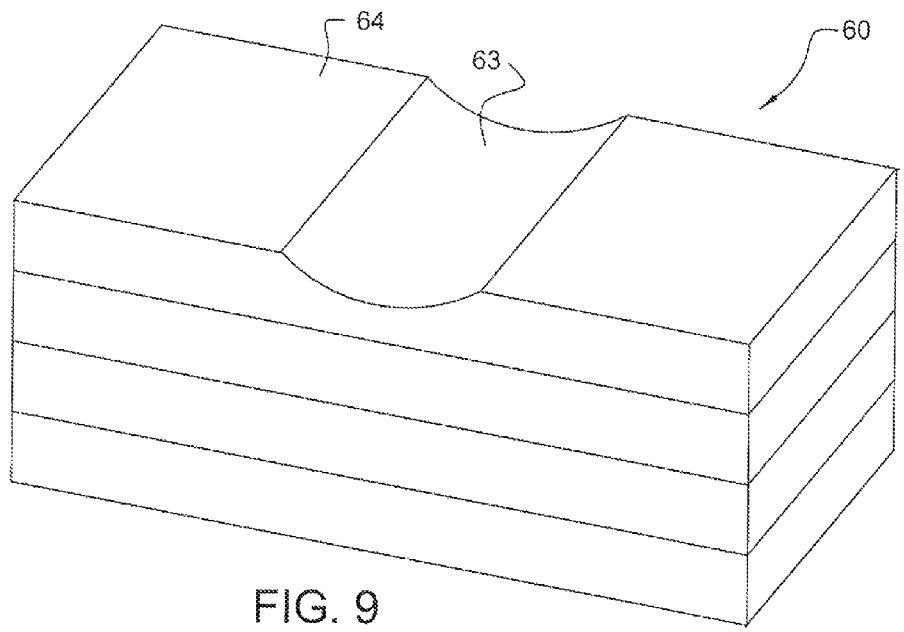
FIG. 9 is a perspective view of another embodiment of the invention consisting of another assembly functional to support a portion of a large pipeline segment.
Figure 10:
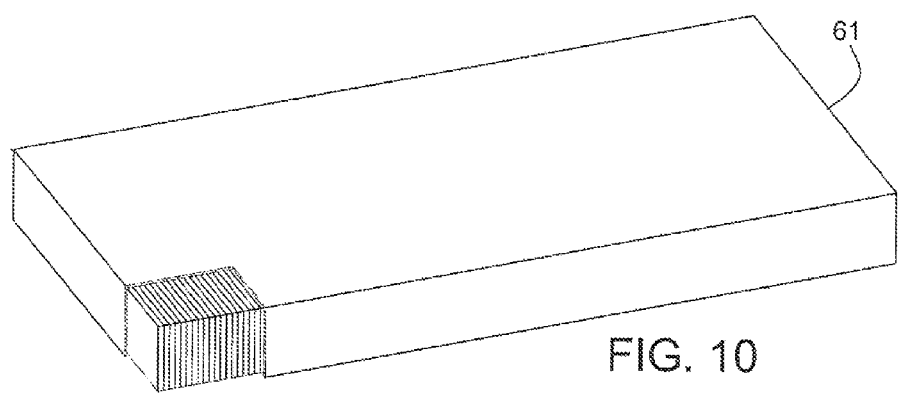
FIG. 10 is a perspective view of a component utilized in forming a tier of the assembly shown in FIG. 9.
Figure 11:
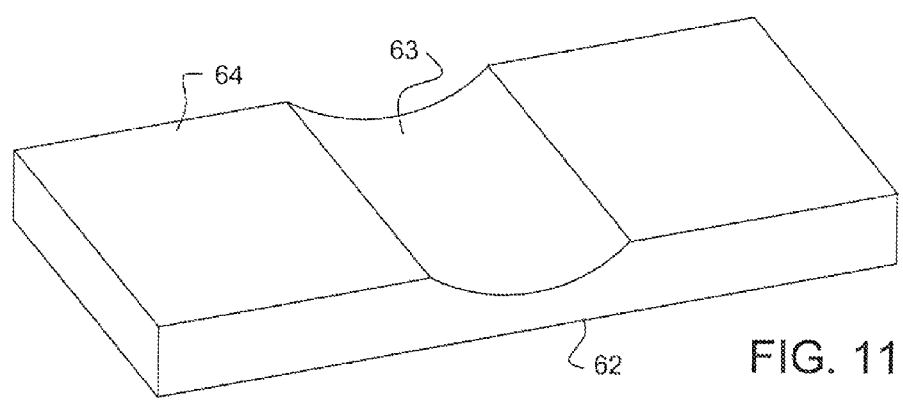
FIG. 11 is a perspective view of a component similar to the component shown in FIG. 10, provided with an elonged recess having a curved cross sectional configuration which may be provided in an upper tier of an assembly as shown in FIG. 9 to receive and support a portion of a pipeline segment.

Referring to FIGS. 9 through 10 of the drawings, there is shown another embodiment of the invention which consists of an assembly 60 comprising a stack of one or more lower tier support segments 61 each configured as shown in FIG. 10 and an upper tier segment 62 configured as shown in FIG. 11. Each lower tier segment 61 is rectangularly configured, preferably measuring 30 inches wide, 48 inches long and 6 inches thick, formed of a biodegradable material. It includes a set of plies of corrugated cardboard adhesively secured together, coated about the periphery thereof, Such adhesive and coating materials are similar to those used with respect to the previously described embodiments of the invention.

Each upper tier segment 62 is configured and constructed similarly to segment 61 in terms of width, length, thickness and internal construction, and further is provided with a curved recess 63 in a planar surface 64 thereof, extending from one long edge thereof to an opposed edge thereof. Such recess is positioned and configured for effectively receiving and supporting a portion of a pipeline segment, when mounted on a stack of lower tier segments 61 as shown in FIG. 9. As partially shown in FIG. 10, the internal construction of each segment 61 and 62 is similar to the internal construction of each of the components of the previously described embodiments as shown in FIG. 8.

The support segments 61 and 62 are usable similarly to the use of the beam members provided in the aforementioned embodiments, are intended to be stacked and stored at an off-site location, transported to one or more sites along a pipeline trench and manually unloaded, and then manually hauled to spaced sites along and adjacent the trench where they are stacked to provide a support for end portions of pipes to be welded together. Each of such stacks would consist of a selected number of lower tier support segments 61 and an upper tier segment 62 positioned on the uppermost segment 61 with the length of recess 63 therein disposed substantially parallel to the trench.

The benefits of the segments as described are that they are simple in design, simple and comparatively inexpensive to produce, easily and economically transportable from an offsite location to an end use site, and lightweight allowing workmen to manually lift, carry, stack and disassemble repeatedly.

From the foregoing detailed description, it will be evident that there are a number of changes, adaptations and modifications of the present invention that come within the province of those having ordinary skill in the art to which the present invention pertains. However, it is intended that all such variations not departing from the spirit of the invention be considered as within the scope thereof as limited solely by the following claims.

The invention claimed is:

1. An assembly for supporting aligned ends of a pair of pipeline segments disposed in a trench to be assembled together in the form of a pipeline to be buried in said trench, composed of components which may be selectively stored at a site distant of said trench; transported between said storage site and said trench; assembled, disassembled, repositioned and reassembled at sites along said trench and/or abandoned in said trench, comprising:
   a base tier including a pair of spaced beams; and
   at least one upper tier including a pair of spaced beams disposed angularly relative to and supported on a set of beams of a lower tier,
   wherein each of said beams is formed of a set of plies of corrugated cardboard secured together with a biodegradable adhesive, and said set of plies is coated with a biodegradable material.

2. The assembly of claim 1 wherein each of the beams of an upper tier is disposed at a right angle relative to a beam in a next lower tier thereof.

3. The assembly of claim 1 wherein the spaced beams of an uppermost tier thereof are provided with aligned depressions on which an elongated member to be mounted therein may be rested.

4. The assembly of claim 1 wherein each of said beams is provided with a pair of spaced recesses in an elongated surface thereof, and portions of beams in an immediately upper tier are received and supported therein.

5. The assembly of claim 4 wherein each of the beams of an upper tier is disposed at a right angle relative to a next lower tier thereof.

6. The assembly of claim 4 wherein the spaced beams of an uppermost tier thereof are provided with aligned depressions on an upper surface thereof on which an elongated member mounted thereon may be rested.

7. The assembly of claim 4 wherein each of said beams is provided with a second pair of spaced recesses in an elongated side thereof opposite said first mentioned side, each aligned with a recess in said first mentioned side thereof, and a portion of a beam in an immediately lower tier is received therein.

8. The assembly of claim 7 wherein each of the beams of an upper tier is disposed at a right angle relative to a beam of a lower tier thereof.

9. The assembly of claim 7 wherein the spaced beams of an uppermost tier thereof are provided with aligned depressions on an upper surface thereof on which an elongated member mounted thereon may be rested.

10. The assembly of claim 1 including a third beam disposed in at least one of said tiers, spaced between a set of beams therein, formed of a set of piles of corrugated cardboard secured together with a biodegradable adhesives, coated with a biodegradable material.

11. The assembly of claim 10 wherein each of the beams of an upper tier is disposed at a right angle relative to a beam in a lower tier thereof.

12. The assembly of claim 10 wherein the spaced beams of an uppermost tier thereof are provided with aligned depressions on which an elongated member to be mounted may be supported.

13. The assembly of claim 10 wherein each of said beams is provided with a set of three spaced recesses with a center one thereof spaced equally from each of the others thereof, and a portion of a beam in an immediately upper tier being received and supported in each thereof.

14. The assembly of claim 13 wherein each of the beams of an upper tier is disposed at a right angle relative to a beam in a lower tier thereof.

15. The assembly of claim 13 wherein the spaced beams of an uppermost tier thereof are provided with aligned depressions on which an elongated member to be mounted may be supported.

16. The assembly of claim 13 wherein each of said beams is proved with a second set of spaced recess in an elongated side thereof opposite said first mentioned side, each aligned with a recess in said first mentioned side thereof, and a portion of a beam in an immediately lower tier is received therein.

17. The assembly of claim 16 wherein each of the beams of an upper tier is disposed at a right angle relative to a beam of a lower tier.

18. A beam formable as a component of an assembly for supporting aligned ends of a pair of pipeline segments disposed in a trench, to be secured together in the formation of a pipeline to be buried in said trench, which may be selectively stored at a site distant of said trench; transported between said storage site and said trench; assembled with similar beams in forming said assembly; disassembled from an assembly thereof; repositioned along said trench; reassembled with similar beams at successive sites along said trench and abandoned in said trench, comprising:
   a plurality of corrugated cardboard plies secured together with a biodegradable adhesive along the lengths thereof to form an elongated member, coated about the exterior thereof with a coating of a biodegradable material.

19. The beam of claim 18 wherein the ridge and furrows of said corrugated cardboard plies are disposed laterally relative to the length of said beam.

20. The beam of claim 18 wherein said biodegradable adhesive comprises one of a group consisting of Dexatrin, starched based glues, Casein glues or Mucilage, and the coating may consist of natural rubber, latex, India rubber, polyisoprene, polymers of isoprene, polyisoprene elastomers, polymer cis-1,4-polyisoprene, 2-octylcyanoacrylate, cyanoacrylate esters and vinyl identified by CAS numbers by the chemical abstracts Service, a division of the American Chemical Society.

21. The beam of claim 18 wherein said biodegradable coating comprises, a natural latex.

22. The beam of claim 18 wherein said beam includes an elongated surface provided with a depression substantially in the center thereof suitable for resting a portion of said weighty component when said beam is disposed in an uppermost tier of a stacked assembly of beams.

23. The beam of claim 18 wherein a elongated surface of said beam is provided with a pair of spaced recesses, each capable of receiving a portion of another beam in forming said stacked assembly.

24. The beam of claim 23 wherein said elongated surface includes a depression between said recess for resting a portion of said weighty component when said beam is disposed in an uppermost tier of a stacked assembly of beams.

25. The beam of claim 23 wherein an elongated opposite surface said beam is provided with a pair of spaced recesses each disposed in transverse alignment with one of said first mentioned pair of spaced recess.

26. The beam of claim 18 wherein an elongated surface of said beam is provided with a set of three spaced recesses, each capable of receiving a portion of another beam in forming said stacked assembly.

27. The beam of claim 26 wherein an elongated opposite surface of said beam is provided with a set of three recesses each disposed in transverse alignment with one of said first mentioned set of three spaced recesses.

* * * * *